(12) United States Patent
Quach

(10) Patent No.: US 7,213,930 B2
(45) Date of Patent: May 8, 2007

(54) POLARIZED PROJECTION DISPLAY

(76) Inventor: Cang V. Quach, 864 Heflin St., Milpitas, CA (US) 95035

( * ) Notice: Subject to any disclaimer, the term of this patent is extended or adjusted under 35 U.S.C. 154(b) by 126 days.

(21) Appl. No.: 11/109,543

(22) Filed: Apr. 18, 2005

(65) Prior Publication Data

US 2006/0232749 A1    Oct. 19, 2006

(51) Int. Cl.
G03B 21/00 (2006.01)
G03B 21/56 (2006.01)
G03B 21/14 (2006.01)
G02B 27/22 (2006.01)

(52) U.S. Cl. ............... 353/122; 359/443; 359/462; 353/20; 353/7

(58) Field of Classification Search ........... 353/122, 353/7, 20; 359/443, 462
See application file for complete search history.

(56) References Cited

U.S. PATENT DOCUMENTS

| 4,190,832 A | 2/1980 | Mohler |
| 4,973,139 A | 11/1990 | Weinhrauch et al. |
| 5,291,184 A | 3/1994 | Iino |
| 5,469,295 A | 11/1995 | Burke |
| 5,510,913 A | 4/1996 | Hashimoto et al. |
| 6,064,521 A | 5/2000 | Burke |
| 6,816,290 B2 | 11/2004 | Mukawa |
| 6,864,927 B1 | 3/2005 | Cathey |
| 6,873,376 B1 | 3/2005 | Rofe |
| 6,992,822 B2 | 1/2006 | Ma et al. |
| 2003/0214632 A1 | 11/2003 | Ma et al. |

FOREIGN PATENT DOCUMENTS

EP    0639788 A1    2/1995

OTHER PUBLICATIONS

"Rear Projection Screen Products," Prodisc Technology Inc. brochure downloaded on Jan. 29, 2005 from http://www.prodisc.com.tw/English/rearprojection-e.htm, pp. 1-5.
"Mitsubishi Monitor," Mitsubishi brochure downloaded on Jan. 29, 2005 from http://www.mitsubishi.or.jp/e/monitor/0306/NP.html, pp. 1-4.
"Virtual Pricess Leia (of sorts)," Tech Digest article downloaded on Feb. 7, 2005 from http://tecgdugestuk.typepad.com/photos/uncategorized/virtual_princess.JPG, 3 pages.

(Continued)

Primary Examiner—William Dowling
Assistant Examiner—Andrew Kong
(74) Attorney, Agent, or Firm—Patent Law Group LLP; David C. Hsia

(57) ABSTRACT

A projection display system includes (1) a transparent screen, (2) a polarizer on the transparent screen, (3) a retarder plate on a first side of the transparent screen, (4) a mirror on the first side of the transparent screen, and (5) a projector for projecting an image through the transparent screen, the polarizer, the retarder plate, and onto the mirror. The mirror reflects the image onto the polarizer so that the reflected image is visible from the first side of the transparent screen and invisible from the second side of the transparent screen.

4 Claims, 6 Drawing Sheets

OTHER PUBLICATIONS

"Hitachi On-Glass Projection," Nexnix brochure downloaded on Jan. 29, 2005 from http://www.nexnix.co.uk/hitachi/onglass_use.htm, pp. 1-2.

"TransFilm Examples," Laser Magic Productions brochure downloaded on Feb. 7, 2005 from http://www.laser-magic.com/TransScreen_gallery1/TSGallery1.html, 1 page.

"Floating 3D Images—Display Innovations," Chops & Associates Live Animation brochure downloaded on Feb. 7, 2005 from http://www.chops.com/Display_Innovations/Floating_3D_Images.htm, pp. 1-4.

"Pronova—HoloPro," Audio Visual & Film Group, Inc. brochure downloaded on Jan. 29, 2005 from http://www.avfg.com/holopro/dealer.htm, pp. 1-3.

"On-glass projection screen," Hitachi brochure, www.hitachiprojectors.com, 4 pages.

E-mail communication of Cang V. Quach, Mar. 17, 2005.

G+B pronova GmbH, "Recent Applications and Systems of HoloPro(TM)," downloaded on Mar. 17, 2005 from www.avfg.com/holopro/dealer.htm.

Annex to Form PCT/ISA/206, Communication Relating to the Result of the Partial International Search, 5 pages.

PCT International Search Report, 6 pages.

PCT Written Opinion of the International Searching Authority, 10 pages.

POLARIZED PROJECTION DISPLAY

FIELD OF INVENTION

This invention relates to projection displays, and specifically to a projection display that is visible from one side of the screen but not the other.

DESCRIPTION OF RELATED ART

Generally speaking, advertising is the paid promotion of goods, services, companies and ideas by an identified sponsor. Advertisements on the side of buildings were common in the early-20th century U.S. One modern example is the NASDAQ sign at the NASDAQ Market Site at 4 Times Square on 43rd Street. Unveiled in January 2000, it cost $37 million to build. The sign is 120 feet high and is the largest LED display in the world. NASDAQ pays over $2 million a year to lease the space for this sign. This is actually considered a good deal in advertising as the number of "impressions" the sign makes far exceeds those generated by other ad forms. However, advertisements on the side of a building cover up what otherwise would be space for windows in the building.

Thus, what is needed is an apparatus that would provide advertisements on the side of buildings while still allowing for windows in the advertisement space.

SUMMARY

In one embodiment of the invention, a projection display system includes (1) a transparent screen, (2) a polarizer on the transparent screen, (3) a retarder plate on a first side of the transparent screen, (4) a mirror on the first side of the transparent screen, and (5) a projector for projecting an image through the transparent screen, the polarizer, the retarder plate, and onto the mirror. The mirror reflects the image onto the polarizer so that the reflected image is visible from the first side of the transparent screen and invisible from the second side of the transparent screen.

BRIEF DESCRIPTION OF THE DRAWINGS

Use of the same reference numbers in different figures indicates similar or identical elements.

DETAILED DESCRIPTION

Figure 1:
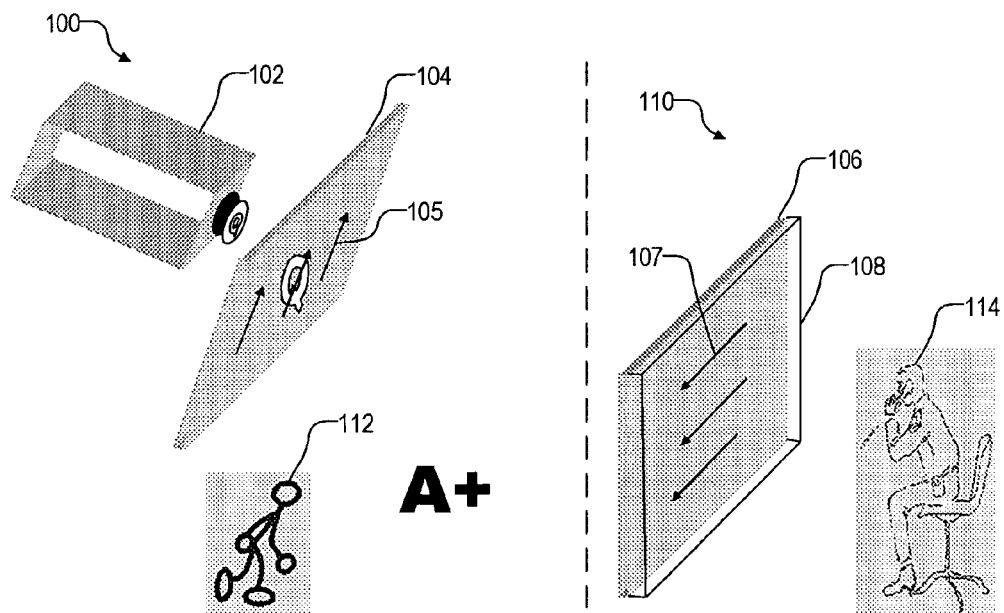
FIG. 1 illustrates a polarized front-projection system in one embodiment of the invention.

FIG. 1 illustrates a polarized front-projection system 100 in one embodiment of the invention. System 100 includes a projector 102 that generates an image "Q." Projector 102 can be a liquid crystal display (LCD) projector, a digital light processing (DLP) projector, or a laser projector. Depending on the application, image Q can be a still advertisement, a slideshow of still advertisements, or a video advertisement.

Image Q propagates through a polarizer 104 having a polarization direction 105. In one embodiment, polarizer 104 is a polarizing film on the lens of projector 102. After passing through polarizer 104, image Q only has light aligned along polarization direction 105.

Image Q then propagates onto a polarizer 106 on a transparent screen 108. Polarizer 106 has a polarization direction 107 different from polarization direction 105 so that image Q cannot propagate through polarizer 106. Thus, image Q is visible on a first side of transparent screen 108 and invisible on a second side of transparent screen 108.

In one embodiment, transparent screen 108 is a window or a glass door on the side of an office building 110. Thus, a pedestrian 112 sees image Q projected onto window 108 while an office worker 114 does not see image Q from within the office. Office worker 114 does see other objects that are illuminated by non-polarized light, such as object "A+." Overall, a large image Q can be projected onto the side of office building 110 without disturbing the office workers within while still providing a view to the office workers. Polarizer 106 can be a film mounted on either side of window 108, it may be easier for installation and maintenance if polarizer 106 is mounted on the inside of window 108. In one embodiment, polarizer 106 has a white side facing the outside that improves the visibility of image Q to pedestrian 112 and a dark side facing the inside that increases the transparency to office worker 114.

Figure 2:
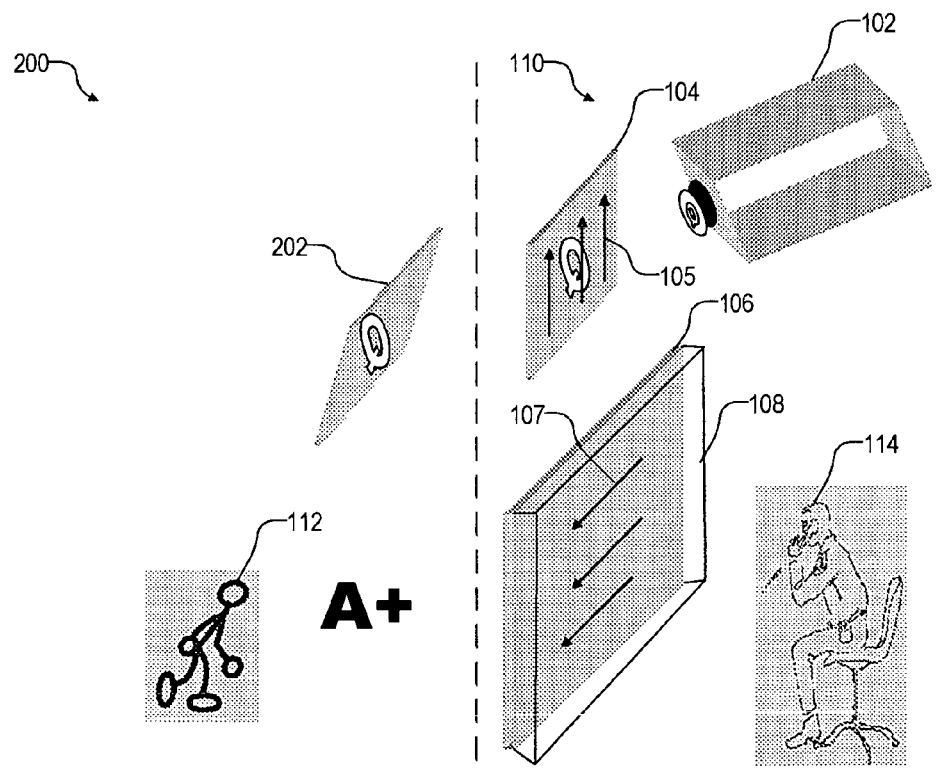
FIG. 2 illustrates a polarized rear-projection system in one embodiment of the invention.

FIG. 2 illustrates a polarized rear-projection system 200 in one embodiment of the invention. System 200 is similar to system 100 except that projector 102 is now placed behind transparent screen 108. In one embodiment, projector 102 is now placed within office building 110 to prevent theft and damage. A projection mirror 202 is provided to bend image Q and project it onto transparent screen 108.

Figure 3:
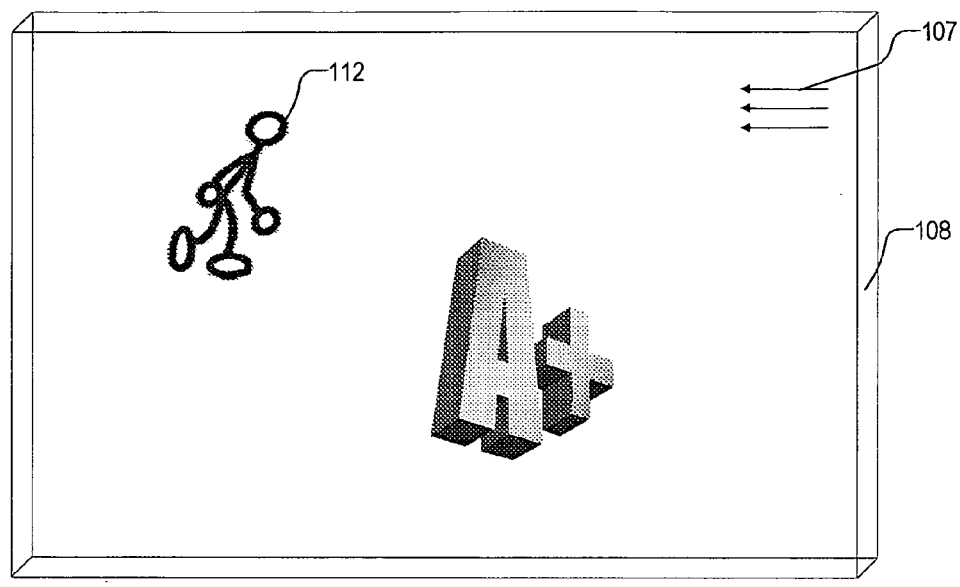
FIGS. 3 and 4 illustrate views through a transparent screen of the systems in FIGS. 1 and 2 in embodiments of the invention.
Figure 4:
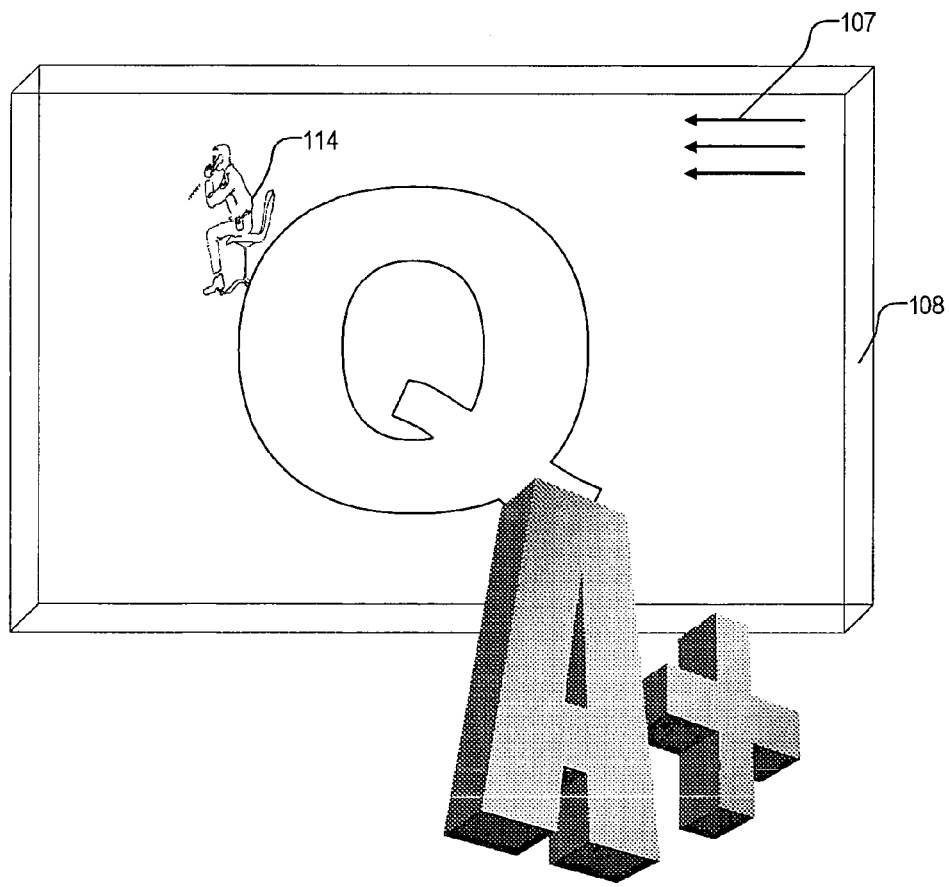

FIG. 3 illustrates the view provided to office worker 114 in one embodiment. As can be seen, office worker 114 sees pedestrian 112 and object A+ through window 108 but not image Q on window 108. FIG. 4 illustrates the view provided to pedestrian 112 in one embodiment. As can be seen, pedestrian 112 sees object A+ before window 108, office worker 114 through window 108, and image Q on window 108.

Figure 5:
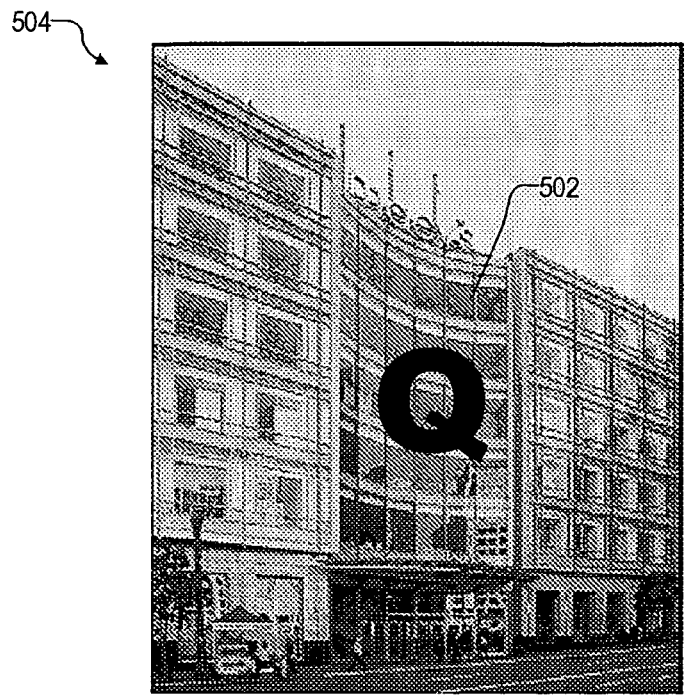
FIGS. 5, 6, 7, 8, 9, 10, and 11 illustrate various applications of the systems in FIGS. 1 and 2 in embodiments of the invention.

Using systems 100 and 200, every transparent screen becomes a window and every window becomes a screen. There are many applications for projection systems 100 and 200. FIG. 5 shows that systems 100 and 200 used to project image Q onto windows 502 of a building 504 in one embodiment. In this application, passersby see image Q (e.g., a large advertisement) but the workers inside building 504 are not disturbed by image Q and continue to enjoy their view to the outside.

Figure 6:
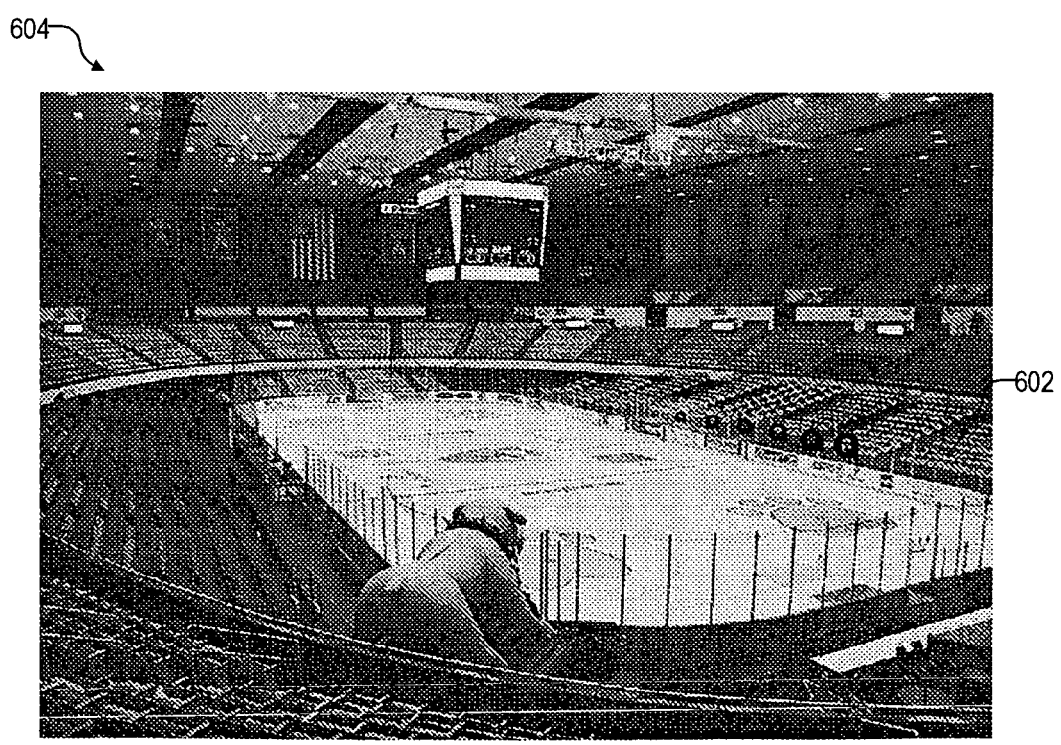

FIG. 6 shows that systems 100 and 200 can be used to project multiple images Q (e.g., multiple advertisements) onto protective glass 602 of a stadium 604 in one embodiment. In this application, the audience sees through protective glass 602 directly before them to view the game but also sees images Q on protective glass across and besides them. Furthermore, television cameras capture images Q for advertisement purposes.

Figure 7:
Figure 8:
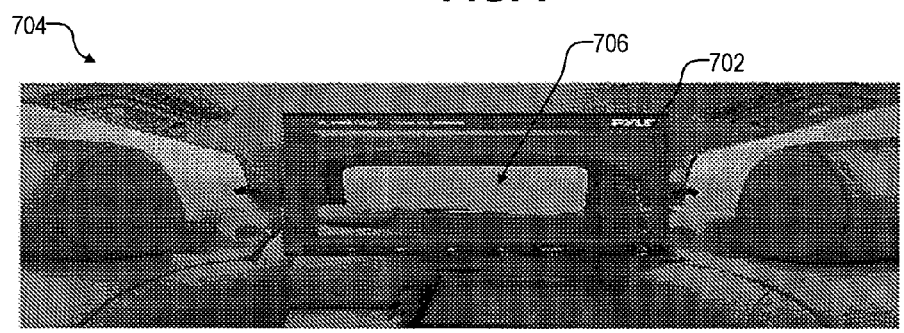

FIGS. 7 and 8 show that systems 100 and 200 can be used to project image Q on a monitor 702 for a motor vehicle 704 in one embodiment. In this application, the rear passengers see image Q on monitor 702 while the driver sees through monitor 702 and out of a rear windshield 706. Thus, monitor 702 can be made larger than conventional monitors because it does not obstruct the view of the driver. In one embodiment, the front windshield of motor vehicle 704 is polarized differently from the polarization of monitor 702 so that external light sources, such as the sun during sunrise or sunset, do not propagate pass the front windshield and through monitor 702. This embodiment prevents external light sources from interfering with image Q on monitor 702.

Figure 9:
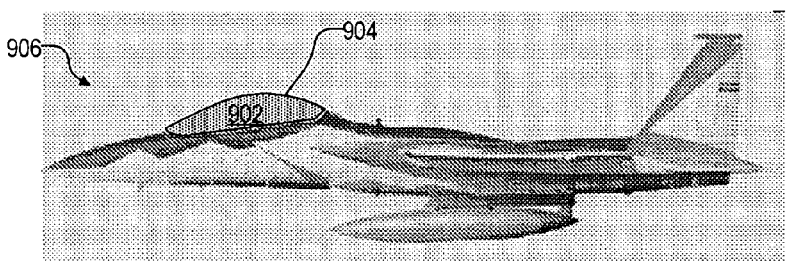
Figure 10:
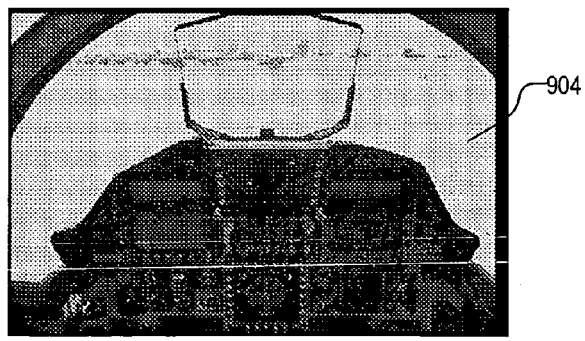

FIGS. 9 and 10 show that systems 100 and 200 can be used to project a camouflage 902 on a cockpit canopy 904 of an airplane 906 in one embodiment. In this application, canopy 904 is camouflaged along with the rest of airplane 906 without obstructing the view of the pilot through canopy 904.

Figure 11:
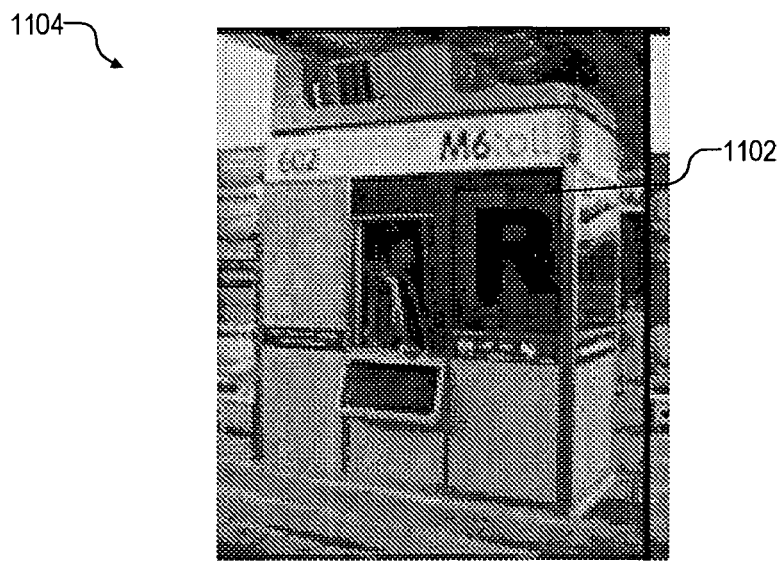

FIG. 11 shows that systems 100 and 200 can be used to project an image R (e.g., a toll amount) on a window 1102 of a toll booth 1104 in one embodiment. In this application, image R on window 1102 is visible to the drivers without obstructing the toll taker's view through window 1102.

Figure 12:
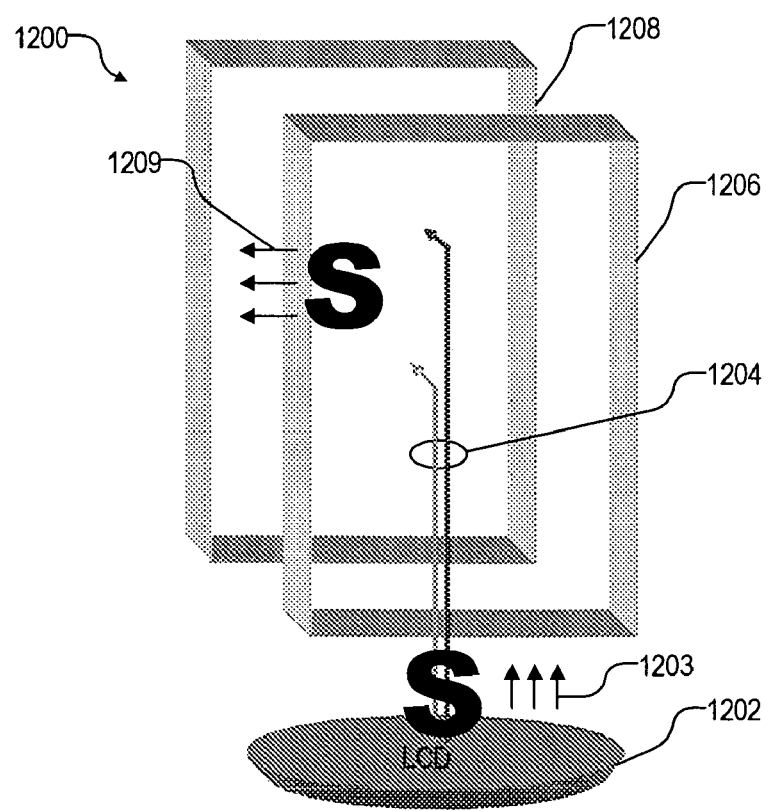
FIG. 12 illustrates a projection system in one embodiment of the invention.

FIG. 12 illustrates a projection system 1200 in one embodiment of the invention. An LCD 1202 projects an image "S" having a polarization direction 1203. A matrix of fiber-optic cables 1204 (only a few are illustrated for clarity) are mounted to LCD 1202 to correspond with the pixels of LCD 1202. The matrix of fiber-optic cables 1204 are then mounted to a transparent screen 1206. The matrix of fiber-optic cables 1204 project image S onto a polarizer 1208 having a polarization direction 1209 different than polarization direction 1203. Polarizer 1208 may be a film mounted on transparent screen 1206. In one embodiment, polarizer 1208 has a white surface that improves the visibility of image S. Thus, image S is visible on a first side of transparent screen 1206 and invisible on a second side of transparent screen 1206. System 1200 can be used in various application described above.

Figure 13:
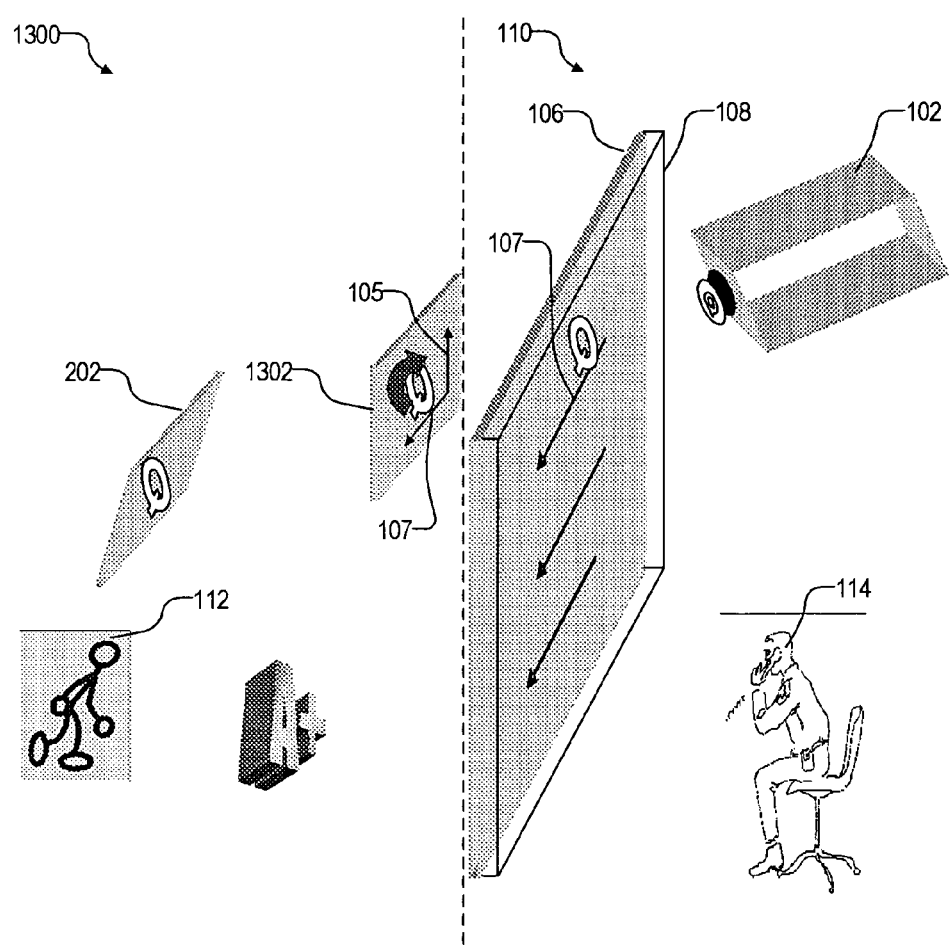
FIG. 13 illustrates a polarized rear-projection system in one embodiment of the invention.

FIG. 13 illustrates a polarized rear-projection system 1300 in one embodiment of the invention. Projector 102 projects image Q through polarizer 106 on transparent screen 108. After propagating through polarizer 106, image Q only has light aligned along polarization direction 107.

Image Q then propagates through a retarder plate 1302 that changes the light polarization from direction 107 to direction 105. In one embodiment, retarder plate 1302 orthogonally rotates the polarization direction of image Q.

Image Q then reflects from projection mirror 202 back onto polarizer 106 on transparent screen 108. Polarizer 106 has polarization direction 107 different from polarization direction 105 so that image Q cannot propagate through polarizer 106. Thus, image Q is visible on a first side of transparent screen 108 and invisible on a second side of transparent screen 108. System 1300 can be used in various application described above.

In system 1300, a small image Q may be visible on transparent screen 108 to office worker 114. This occurs when projector 102 projects images with randomly polarized light that is partly transmitted through polarizer 106 and partly reflected by polarizer 106. The small reflected image Q can be avoided by using an LCD projector 102 that produces images with light aligned along polarization direction 107. Alternatively, an additional polarizer having polarization direction 107 can be placed before or on the lens of projector 102.

Various other adaptations and combinations of features of the embodiments disclosed are within the scope of the invention. Numerous embodiments are encompassed by the following claims.

What is claimed is:

1. A projection display system, comprising:
   a transparent screen;
   a polarizer on the transparent screen, the polarizer having a first polarization direction;
   a retarder plate on a first side of the transparent screen;
   a mirror on the first side of the transparent screen;
   a projector on a second side of the transparent screen, wherein:
      the projector projects an image through the transparent screen, the polarizer, the retarder plate, and onto the mirror;
      the mirror reflects the image onto the polarizer so that the reflected image is visible from the first side of the transparent screen and invisible from the second side of the transparent screen.

2. The system of claim 1, wherein the transparent screen is selected from the group consisting of a window of a building, a protective glass in a stadium, a monitor inside a motor vehicle, a window of a toll booth, and an airplane canopy.

3. A method for projecting an image on a transparent screen so the image is visible from a first side of the transparent screen but invisible from a second side of the transparent screen, the method comprising: projecting the image through (1) a polarizer on the transparent screen and (2) a retarder plate, wherein the polarizer has a first polarization direction and the retarder plate changes light aligned along the first polarization direction to a second polarization direction; and reflecting the image back onto the polarizer on the transparent screen.

4. The method of claim 3, wherein the transparent screen is selected from the group consisting of a window of a building, a protective glass in a stadium, a monitor inside a motor vehicle, a window of a toll booth, and an airplane canopy.

* * * * *